United States Patent
Kim

(10) Patent No.: US 10,749,764 B2
(45) Date of Patent: Aug. 18, 2020

(54) DEVICE FOR GENERATING AND SEARCHING SENSOR TAG DATA IN REAL TIME

(71) Applicant: Machbase, Inc., Seoul (KR)

(72) Inventor: Sung Jin Kim, Seoul (KR)

(73) Assignee: Machbase, Inc., Seoul (KR)

( * ) Notice: Subject to any disclaimer, the term of this patent is extended or adjusted under 35 U.S.C. 154(b) by 127 days.

(21) Appl. No.: 16/109,321

(22) Filed: Aug. 22, 2018

(65) Prior Publication Data

US 2020/0059422 A1 Feb. 20, 2020

(30) Foreign Application Priority Data

Aug. 17, 2018 (KR) .......................... 10-2018-0095948

(51) Int. Cl.
*H04L 12/26* (2006.01)
*G06F 9/30* (2018.01)
*H04L 29/08* (2006.01)
*G06F 16/28* (2019.01)

(52) U.S. Cl.
CPC ........ *H04L 43/028* (2013.01); *G06F 9/30043* (2013.01); *G06F 16/283* (2019.01); *H04L 43/024* (2013.01); *H04L 67/12* (2013.01)

(58) Field of Classification Search
None
See application file for complete search history.

(56) References Cited

U.S. PATENT DOCUMENTS

| 6,360,214 | B1 | 3/2002 | Ellis et al. | |
|---|---|---|---|---|
| 2013/0103657 | A1* | 4/2013 | Ikawa | G06F 16/2477 |
| | | | | 707/693 |
| 2015/0002272 | A1* | 1/2015 | Alonso | H04W 4/02 |
| | | | | 340/10.1 |
| 2018/0032596 | A1* | 2/2018 | Bolotskikh | G05B 19/0428 |
| 2018/0232459 | A1* | 8/2018 | Park | G06F 16/2477 |

FOREIGN PATENT DOCUMENTS

| JP | 2011-221799 A | 11/2011 |
|---|---|---|
| JP | 5503737 B2 | 5/2014 |

* cited by examiner

*Primary Examiner* — Sargon N Nano
*Assistant Examiner* — Christopher B Robinson
(74) *Attorney, Agent, or Firm* — Studebaker & Brackett PC

(57) ABSTRACT

A device for generating and searching sensor tag data in real time is provided. The device can include a rollup executor that is configured to generate statistics data per time from raw data; and a rollup memory storing per-second statistics data in units of seconds for new input data and per-minute statistics data in units of minutes for the per-second statistics data, where the statistics data can be automatically calculated and provided by the system by using statistics for time series sensor tag data based on tag names/times.

9 Claims, 2 Drawing Sheets

DEVICE FOR GENERATING AND SEARCHING SENSOR TAG DATA IN REAL TIME

CROSS-REFERENCE TO RELATED APPLICATIONS

This application claims the benefit of Korean Patent Application No. 10-2018-0095948, filed with the Korean Intellectual Property Office on Aug. 17, 2018, the disclosure of which is incorporated herein by reference in its entirety.

This work was supported by Seoul Metropolitan City funded by the Korean Government (CI160021).

BACKGROUND

1. Technical Field

The present invention relates to a device for generating and searching sensor tag data in real time. More particularly, the invention relates to a method and device for real-time generating and referencing of statistics regarding time series sensor tag data.

2. Description of the Related Art

Time series sensor data inherently involves generating large quantities of data at high speeds. An important issue with processing sensor data is to visualize the data via statistical computations and analyzing the results. There is the problem, however, that real-time searching and performing statistical computations for the purpose of visualizing data for a certain period, which may range from a few minutes in some cases to several years in others, is virtually impossible even with powerful big data processing systems.

Regarding the issue of visualizing sensor data from a data perspective, what is required involves searching several million pieces of data associated with a particular sensor from among several hundred billion pieces of data and then sorting the data in order of time. To this sorted data, computations for obtaining the average of the data, etc., are performed to find the representative value for each unit time segment, and the results are visualized. Here, a large amount of disk I/O may occur for indexing to enable searches, and a large amount of CPU computations may occur for the sorting and obtaining representative values.

A similar prior art document related to the present invention is U.S. Pat. No. 6,360,214 B1. U.S. Pat. No. 6,360,214 B1 is similar to the concept address by the present invention in that statistics data is created automatically in a relational database system. U.S. Pat. No. 6,360,214 B1 teaches recording updates and additions to input data and reading and incorporating the data whenever there is updated and added data in the statistics data columns.

However, U.S. Pat. No. 6,360,214 B1 includes no suggestion regarding the generating of time-based statistics values related to time series data. U.S. Pat. No. 6,360,214 B1 simply regenerates statistics values by using added/updated/deleted data. Also, since U.S. Pat. No. 6,360,214 B1 updates only the most recent values and does not generate data results as a time series, this would not be suitable for the purposes of data history, etc.

SUMMARY OF THE INVENTION

The present invention, conceived to resolve the problems described above, provides a method and device for automatically generating statistics for sensor tag data at the time data is inputted, in order to reduce the enormous computational cost resulting from processing sensor tag data.

Also, the invention provides a method and device for generating and referencing real-time statistics for time series sensor tag data that can provide statistics values quickly and easily by way of a query language that is expanded from the basic query language of SQL.

The invention provides a device for generating and searching sensor tag data in real. The device can include a rollup executor that is configured to generate statistics data per time from raw data; and a rollup memory storing per-second statistics data in units of seconds for new input data and per-minute statistics data in units of minutes for the per-second statistics data, where the statistics data can be automatically calculated and provided by the system by using statistics for time series sensor tag data based on tag names/times.

In one embodiment, the rollup executor can store the per-second statistics data in a rollup_sec table and can store the per-minute statistics data in a rollup_min table. Here, the per-second data and the per-minute data can be recorded with a minimum, a maximum, a count, and a sum calculated for each tag name and time group.

In one embodiment, an interface configured to receive an input query can further be included. Here, the rollup executor can determine whether to search the per-second statistics data (rollup_sec data), the per-minute statistics data (rollup_min data), or raw data, according to the input query. Also, the rollup executor can transmit a search request for the per-second statistics data and the per-minute statistics data to the rollup memory. Also, the rollup executor can transmit a search request for the raw data to a raw memory.

In one embodiment, the input query can include first information, which may be associated with a tag name and time of a search target, and second information, which may be associated with a minimum, a maximum, a count, a sum, and an average. Here, the rollup executor can search a corresponding statistics table based on a group selected according to the first information with respect to the per-second statistics data and the per-minute statistics data.

In one embodiment, the rollup executor can obtain corresponding statistics data from the corresponding statistics table based on at least one of the minimum, maximum, count, sum, and average included in the second information.

In one embodiment, the interface can be further configured to receive sensor data from a multiple number of IoT sensor devices. Here, the sensor data can be stored as the raw data in a raw memory that is physically separate from the rollup memory, where the raw data may include a device ID, measurement time, and measurement value of a particular IoT device. Here, the tag name can be assigned differently for each of the multiple number of IoT devices. The rollup memory can store the per-second statistics data from the raw data in the rollup_sec table and can store the per-minute statistics data in the rollup_min table for each of the multiple IoT devices.

In another embodiment, the tag names can be assigned for a multiple number of different sensing groups according to the sensing purposes of the systems to which the multiple IoT devices belong. Here, the rollup memory can store the per-second statistics data from the raw data in the rollup_sec table and store the per-minute statistics data in the rollup_min table for each of the multiple sensing groups. Here, a particular IoT sensor device from among the multiple IoT sensor devices can be included in two or more of the sensing groups during a particular period of time.

In one embodiment, in an environment where the sensor data is not updated but is bulk deleted based on input time after being inputted into the raw memory, the per-second statistics data can be stored in the rollup_sec table of the rollup memory, and the per-minute statistics data can be stored in the rollup_min table of the rollup memory.

In one embodiment, the per-second statistics data and the per-minute statistics data can be processed into tag metadata, which may be associated with the tag names, rollup metadata, which may be associated with rollup data values stored in the rollup memory, and performance view metadata, which may be associated with the performance of the per-second statistics data and the per-minute statistics data. Here, the tag metadata, the rollup metadata, and the performance view metadata can be transmitted by way of a REST API to different external devices according to the tag names.

At least one embodiment of the invention offers the advantage of automatically calculating and providing statistics data by using the statistics for time series sensor tag data based on tag names/times.

Also, at least one embodiment of the invention offers the advantage of enabling searches using an existing query for a raw table name instead of the table in which the statistics values are stored.

Also, according to at least one embodiment of the invention, each statistics value is generated for each second/minute/hour based on tag names/times, and there is the advantage that queries on statistics data based on time can be executed very quickly.

Additional aspects and advantages of the invention will be set forth in part in the description which follows, and in part will be obvious from the description, or may be learned by practice of the invention.

BRIEF DESCRIPTION OF THE DRAWINGS

A brief description of each drawing is provided below to allow a better understanding of the drawings referred to in the detailed description of the invention.

DETAILED DESCRIPTION OF THE INVENTION

Figure 1:
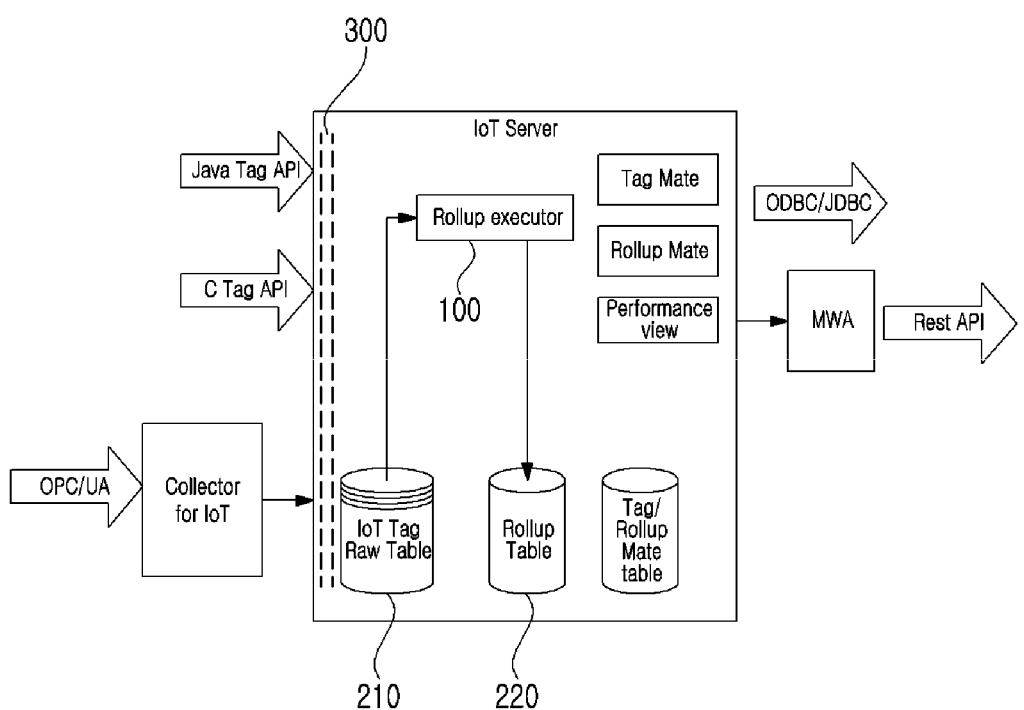
FIG. 1 illustrates the composition of a device for generating and searching sensor tag data in real according to an embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

In describing the invention, detailed explanations of the related known art are omitted if it is deemed that such explanations may unnecessarily obscure the essence of the invention. Also, ordinal numbers (e.g. first, second, etc.) used in the descriptions of the present specification are merely intended as identification to differentiate one component from another component.

In the present specification, when reference is made to one component being "connected" or "joined", etc., to another component, it should be appreciated that, while the one component and the other component can be directly connected or directly joined together, the components can be connected or joined by way of one or more other components interposed therebetween, unless there is specific statements to the contrary.

Terms such as "module" and "part" for certain components used in the descriptions below have been added and are interchangeable for the sake of convenience in drafting the specification, and the terms themselves do not have distinguishable meanings or functions. Also, for a clearer description of the invention, portions that are of no relevance have been omitted in the drawings, and the same reference numerals have been made to refer to the same components throughout the specification.

Below, a description is provided of a device for generating and searching sensor tag data in real time according to certain embodiments of the invention.

A piece of sensor tag data according to an embodiment of the invention may have the form of <Time, TagName, Value, additional option column>. Such sensor data can be referenced with a query such as the following.

```
SELECT tagname, time, value FROM tag_table WHERE
TagName = 'tag_name' and
time between start_time and end_time order by time asc
```

If the number of records obtained from the above query is too high, then a statistical computation may be performed on the result set with respect to time for visualization.

The statistical computation for visualization can be performed with a query such as the following.

```
SELECT tagname, t, avg(value) FROM tag_table WHERE
TagName = 'tag_name' and time between start_time
and end_time group by tagname, date_trunc(time, second) as t
order by tagname, t asc
```

When the query above is executed, several tens of thousands to several hundreds of thousands of pieces of data entered in 1 second can be converted into one average value, allowing visualization. However, the additional computational cost for the statistics processing can lower performance.

Below, a more detailed description is provided on practicing an embodiment of the invention, with reference to the accompanying drawings.

FIG. 1 illustrates the composition of a device for generating and searching sensor tag data in real according to an embodiment of the invention.

The sensor tag data according to an embodiment of the invention may be collected in an environment where updating data is not possible and, after data is inputted, only bulk deletion is performed based on the inputted time. Therefore, with such sensor tag data according to an embodiment of the invention, it is possible to access new data by using record identifiers.

Referring to FIG. 1, a device for generating and searching sensor tag data can be referred to as an IoT server. The device for generating and searching sensor tag data may include a rollup executor 100, a raw memory 210, a rollup memory 220, and an interface 300. Here, the raw memory 210 and the rollup memory 220 can be referred to as a raw table 210 and a rollup table 220, respectively.

In relation to the above, the rollup executor 100 may use input data to generate timewise statistics data, and this data may be inputted to the rollup memory 220. A search request for timewise statistics data can be searched in and provided from the rollup table instead of the actual raw table.

Below, a description is provided of the detailed composition and operation of a device that performs the generating of sensor tag data in real time as described above.

The rollup executor 100 may be configured to generate timewise statistics data from raw data. Here, the raw data may correspond to the data collected from IoT devices and may be data stored in the raw memory 210 of the devices.

The rollup memory 220 may be configured to store per-second statistics data, which describes statistics of new input data in units of seconds, and store per-minute statistics data, which describes statics of the per-second statistics data in units of minutes.

The rollup memory 220 may be configured to store the per-second statistics data in a rollup_sec table and store the per-minute statistics data in a rollup_min table. Here, the per-second statistics data and the per-minute statistics data can be recorded with the minimum (min), maximum (max), count, and sum calculated for each tag name and time group.

Figure 2:
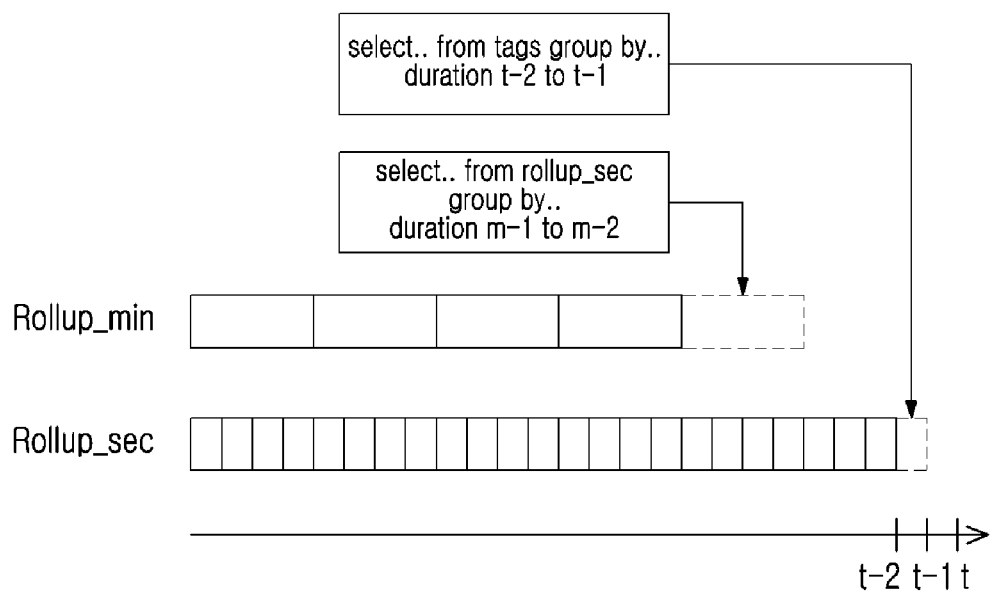
FIG. 2 is a conceptual diagram illustrating a method of performing statistical computations on statistics data for newly inputted data among sensor tag data according to an embodiment of the invention.

FIG. 2 is a conceptual diagram illustrating a method of performing statistical computations on statistics data for newly inputted data among sensor tag data according to an embodiment of the invention.

Referring to FIG. 2, statistical computations may be performed on new input data every second and store the results in the rollup_sec table. Also, the statistics values may be generated for the per-second statistics data every minute and inputted to the rollup_min table.

Here, the statistics data can be generated for each tag name and time unit by using a "group by" clause, and the min, max, count, and sum can be calculated and recorded for each tag name/time group.

The matter of whether to search rollup_min, rollup_sec, or raw data can be determined according to the input query.

If the inputted data is data from a time point earlier than that of already stored data, it is possible for pieces of data from the same time point occur redundantly in the rollup table. Thus, when obtaining data from the rollup table, statistical computations may be performed again on the statistics values, in order to remove redundant values, whereby the desired results may be obtained.

```
SELECT tagname, t, avg(value) FROM tag_table WHERE
TagName = 'tag_name' and time between start_time and
end_time group by tagname, date_trunc(time, second) as t
order by tagname, t asc
```

Below, a description is provided of the detailed composition and operation of a device that performs the generating and searching of sensor tag data in real time as described above.

In relation to the above, the interface 300 may be configured to receive an input query or may be configured to receive sensor data from a multiple number of IoT sensor devices.

When an input query is received via the interface 300, the rollup executor 100 can perform the following operations according to the input query. Depending on the input query, the rollup executor 100 can determine whether to search the per-second statistics data (rollup_sec data), the per-minute statistics data (rollup_min data) or raw data. Accordingly, the rollup executor 100 can transmit a search request for the per-second statistics data and the per-minute statistics data to the rollup memory 220. On the other hand, the rollup executor 100 can transmit a search request for raw data to the raw memory 210 and receive the corresponding raw data from the raw memory 210.

The specific operations involved in a method of searching statistics data according to an embodiment of the invention may be as follows. In an embodiment of the invention, the statistics data is grouped according to tag name and time. However, in order for a user to search the corresponding data in a query language, the search may have to be performed on statistics tables rather than the raw tables. Even when performing a search in a raw table, a SQL hint clause can be used to obtain previously generated statistics data.

First, an example of searching statistics data for a particular tag name in units of seconds and an example of searching statistics data for a particular tag name in units of minutes may be as follows.

```
SELECT /*+ ROLLUP (TAG, sec) */
    time , value
FROM   TAG
WHERE tag_name = 'TAG_0001'
    AND tag_time between xxx and xxx;
SELECT /*+ ROLLUP (TAG, sec, min ) */
    time , value
FROM   TAG
WHERE tag_name = 'TAG_0001'
    AND tag_time between xxx and xxx;
```

Next, an example of searching an average value (avg_value) and/or a minimum value (min_value) within a particular time segment may be as follows.

```
SELECT time , avg_value
FROM _tag_rollup_sec_X
WHERE tag_name = 'TAG_0001'
    AND tag_time between xxx and xxx;
SELECT time , min_value
FROM _tag_rollup_sec_X
WHERE tag_name = 'TAG_0001'
    AND tag_time between xxx and xxx;
```

Next, when using a SQL hint clause, the description of each parameter may be as follows.

```
.ROLLUP Hint
   arg1: table name
        essential parameter
   arg2: time unit (sec, min, hour)
        essential parameter
   arg3: aggregate function (avg, sum, count, min, max)
        aggregate function corresponding to inputted values,
        calculates value (column having SUMMARIZED flag)
```

That is, by using ROLLUP hint, it is possible to obtain statistics results for second/minute/hour units. If there is a rollup hint clause, and if there are time, tag name, and a supported set function (min, max, count, sum, avg), then a previously calculated statistics value may be returned.

The specific operations involved in a method of searching statistics data according to the embodiment of the invention described above may be as follows.

As described above, an input query can include first information regarding the tag name and time of the search target and can include second information regarding a minimum (min), maximum (max), count (count), sum (sum), and average (avg). Here, the rollup executor 100 can search a corresponding statistics table based on groups selected according to the first information, for the per-second statistics data and the per-minute statistics data.

The rollup executor 100 can perform a search, not on the entire sensor tag data of a corresponding sensor, but on the statistics values. Accordingly, the rollup executor 100 can obtain the corresponding statistics data from the corresponding statistics table based on at least one of the minimum (min), maximum (max), count (count), sum (sum), and average (avg) included the second information. Here, the minimum value, maximum value, and/or average value of the sensor tag data can be obtained for a particular tag name and time segment. Alternatively, the sensor data greater than or equal to a particular minimum value or smaller than or equal to a particular maximum value can be searched for the particular tag name and time segment. As yet another alterative, the minimum value, maximum value, and/or average value of sensor data that has been filtered to be greater than or equal to a particular value or smaller than or equal to a particular value can be obtained for the particular tag name and time segment.

The method and device for generating and searching sensor tag data in real time according to an embodiment of the invention can use sensor data from a multiple number of IoT sensor devices. More specifically, it is possible to generate and search statistics data according to tag names that have been designated for a multiple number of different sensing groups based on the sensing purposes of the systems in which the multiple IoT sensor devices are included or according to tag names that have been assigned differently for the different IoT devices. A more detailed description of a method of generating and searching statistics data according to sensing device and/or sensing purpose is provided as follows.

In relation to the above, the interface 300 may further be configured to receive sensor data from a multiple number of IoT sensor devices as described above. Here, the sensor data may be stored as raw data in a raw memory 210 that is physically separate from the rollup memory 220. The raw data can include the ID of specific IoT devices, the measurement times, and the measurement values.

A method of generating and searching statistics data according to tag names that have been assigned differently for multiple IoT devices may proceed as follows. Here, the tag name can be assigned differently for each of the multiple IoT devices. Accordingly, the rollup executor 100 can store the per-second statistics data from the raw data in the rollup_sec table and can store the per-minute statistics data in the rollup_min table, for each of the multiple number of IoT devices.

A method of generating and searching statistics data according to tag names that have been designated for a multiple number of different sensing groups according to the sensing purposes of the systems to which the multiple IoT devices belong may proceed as follows. Here, the tag names can be designated for multiple different sensing groups according to the sensing purposes of the systems in which the multiple IoT sensor devices are included. For example, a building maintenance system can include multiple numbers of temperature/humidity/wattage sensors. Here, the multiple temperature sensors within a particular zone can be designated by one tag name, according to the purpose of sensing temperature for temperature control by the building maintenance system. Thus, temperature sensors within another zone can be designated by another tag name. This system is not limited to a building maintenance system but rather is applicable to various types of control systems. Moreover, the above can be applied not only to control systems but also to various computing systems composed of servers and clients.

In the method of generating and searching statistics data according to tag names that were designated for different sensing groups according to the purpose of the sensing as described above, the rollup executor 100 can perform the following operations. That is, for each of the multiple sensing groups, the rollup executor 100 can store the per-second statistics data from the raw data in the rollup_sec table and store the per-minute statistics data in the rollup_min table. Accordingly, a particular IoT sensor device from among the multiple IoT sensor devices can be included in two or more of the multiple sensing groups for a particular period of time. For example, in a building maintenance system, the temperature sensors within a first zone and the temperature sensors within a second zone may be managed under different tag names. However, a particular temperature sensor at a boundary area between the first zone and the second zone can be included in two or more sensing groups. Here, in cases where the control of temperature, etc., in each zone is performed dynamically with the passage of time, a particular sensor can be included in two or more sensing groups.

As described above, the sensor (tag) data according to an embodiment of the invention can be statistically processed in various ways in an environment where the data is not updated but only bulk deleted based on input time after the data is inputted to the raw memory. For example, the per-second statistics data can be stored in the rollup_sec table of the rollup memory 220, and the per-minute statistics data can be stored in the rollup_min table of the rollup memory 220.

The per-second statistics data and the per-minute statistics data can be processed into various metadata as shown in FIG. 1. That is, the per-second statistics data and the per-minute statistics data can be processed into tag metadata, which may be associated with tag names, rollup metadata, which may be associated with the rollup data values stored in the rollup memory, and performance view metadata, which may be associated with the performance of the per-second statistics data and per-minute statistics data.

Subsequently, the tag metadata, the rollup metadata, and the performance view metadata can be transmitted through by way of a REST API to different external devices according to the tag names.

A device for generating and searching sensor tag data in real time according to certain embodiments of the invention has been described above.

According to at least one embodiment of the invention, statistics data can be automatically calculated and provided by using the statistics for time series sensor tag data based on tag names/times.

Also, according to at least one embodiment of the invention, it is possible to make searches using an existing query for a raw table name instead of the table in which the statistics values are stored.

Also, according to at least one embodiment of the invention, each statistics value is generated for each second/minute/hour based on tag names/times, so that queries on statistics data based on time can be executed very quickly.

The embodiments of the present invention disclosed above are intended, not to limit, but to describe the technical spirit of the invention. Thus, the scope of the technical spirit of the present invention is not limited by the embodiments above.

The scope of protection of the present invention is to be interpreted by the scope of claims below, and all technical concepts within the scope of equivalency are to be interpreted as being encompassed by the scope of the present invention.

What is claimed is:

1. A device for generating and searching sensor tag data in real time, the device comprising:
   a rollup executor configured to generate statistics data per time from raw data;
   a rollup memory storing per-second statistics data in units of seconds for new input data and per-minute statistics data in units of minutes for the per-second statistics data; and
   an interface configured to receive an input query,
   wherein the rollup executor stores the per-second statistics data in a rollup_sec table and stores the per-minute statistics data in a rollup_min table,
   the per-second data and the per-minute data are recorded with a minimum, a maximum, a count, and a sum calculated for each tag name and time group,
   the interface is further configured to receive sensor data from a plurality of IoT sensor devices,
   the sensor data is stored as the raw data in a raw memory, the raw memory being physically separate from the rollup memory, the raw data including a device ID, measurement time, and measurement value of a particular IoT device,
   the tag names are assigned for a plurality of different sensing groups according to sensing purposes of systems having the plurality of IoT devices included therein,
   the rollup memory stores the per-second statistics data from the raw data in the rollup_sec table and stores the per-minute statistics data in the rollup_min table for each of the plurality of sensing groups, and
   a particular IoT sensor device from among the plurality of IoT sensor devices is included in two or more of the plurality of sensing groups during a particular period of time.

2. The device for generating and searching sensor tag data in real time according to claim 1,
   wherein the rollup executor determines whether to search the per-second statistics data (rollup_sec data), the per-minute statistics data (rollup_min data), or raw data according to the input query,
   the rollup executor transmits a search request for the per-second statistics data and the per-minute statistics data to the rollup memory,
   and the rollup executor transmits a search request for the raw data to a raw memory.

3. The device for generating and searching sensor tag data in real time according to claim 1, wherein the input query includes first information and second information, the first information associated with a tag name and time of a search target, the second information associated with a minimum, a maximum, a count, a sum, and an average,
   and the rollup executor searches a corresponding statistics table based on a group selected according to the first information with respect to the per-second statistics data and the per-minute statistics data.

4. The device for generating and searching sensor tag data in real time according to claim 3, wherein the rollup executor obtains corresponding statistics data from the corresponding statistics table based on at least one of the minimum, maximum, count, sum, and average included in the second information.

5. The device for generating and searching sensor tag data in real time according to claim 1, wherein the interface is further configured to receive sensor data from a plurality of IoT sensor devices,
   the sensor data is stored as the raw data in a raw memory, the raw memory being physically separate from the rollup memory, the raw data including a device ID, measurement time, and measurement value of a particular IoT device,
   the tag name is assigned differently for each of the plurality of IoT devices,
   and the rollup memory stores the per-second statistics data from the raw data in the rollup_sec table and stores the per-minute statistics data in the rollup_min table for each of the plurality of IoT devices.

6. The device for generating and searching sensor tag data in real time according to claim 5, wherein, in an environment where the sensor data is not updated but is bulk deleted based on input time after being inputted into the raw memory, the per-second statistics data is stored in the rollup_sec table of the rollup memory, and the per-minute statistics data is stored in the rollup_min table of the rollup memory.

7. The device for generating and searching sensor tag data in real time according to claim 1, wherein, in an environment where the sensor data is not updated but is bulk deleted based on input time after being inputted into the raw memory, the per-second statistics data is stored in the rollup_sec table of the rollup memory, and the per-minute statistics data is stored in the rollup_min table of the rollup memory.

8. A device for generating and searching sensor tag data in real time, the device comprising:
   a rollup executor configured to generate statistics data per time from raw data;
   a rollup memory storing per-second statistics data in units of seconds for new input data and per-minute statistics data in units of minutes for the per-second statistics data; and
   an interface configured to receive an input query,
   wherein the rollup executor stores the per-second statistics data in a rollup_sec table and stores the per-minute statistics data in a rollup_min table,
   the per-second data and the per-minute data are recorded with a minimum, a maximum, a count, and a sum calculated for each tag name and time group,
   the interface is further configured to receive sensor data from a plurality of IoT sensor devices,
   the sensor data is stored as the raw data in a raw memory, the raw memory being physically separate from the rollup memory, the raw data including a device ID, measurement time, and measurement value of a particular IoT device,
   the tag name is assigned differently for each of the plurality of IoT devices,
   the rollup memory stores the per-second statistics data from the raw data in the rollup_sec table and stores the per-minute statistics data in the rollup_min table for each of the plurality of IoT devices,
   the per-second statistics data and the per-minute statistics data are processed into tag metadata associated with the tag names, rollup metadata associated with rollup data values stored in the rollup memory, and performance view metadata associated with a performance of the per-second statistics data and the per-minute statistics data, and the tag metadata, the rollup metadata, and the performance view metadata are transmitted by way of a REST API to different external devices according to the tag names.

9. The device for generating and searching sensor tag data in real time according to claim 1, wherein the per-second statistics data and the per-minute statistics data are processed into tag metadata associated with the tag names, rollup metadata associated with rollup data values stored in the rollup memory, and performance view metadata associated with a performance of the per-second statistics data and the per-minute statistics data, and the tag metadata, the rollup metadata, and the performance view metadata are transmitted by way of a REST API to different external devices according to the tag names.

* * * * *